United States Patent
Zimmerman

Patent Number: 6,057,443
Date of Patent: May 2, 2000

[54] DIMORPHOLINODIETHYLETHER HAVING IMPROVED ISOCYANATE STABILITY

[75] Inventor: Robert LeRoy Zimmerman, Austin, Tex.

[73] Assignee: Huntsman Petrochemical Corporation, Austin, Tex.

[21] Appl. No.: 08/790,391

[22] Filed: Jan. 29, 1997

Related U.S. Application Data

[62] Division of application No. 08/414,937, Mar. 31, 1995, abandoned.

[51] Int. Cl.[7] .................................................. C07D 265/30
[52] U.S. Cl. .............................. 544/177; 544/87; 544/78; 544/162
[58] Field of Search ................................ 544/87, 78, 162, 544/177

[56] References Cited

U.S. PATENT DOCUMENTS

| | | | |
|---|---|---|---|
| 3,152,998 | 10/1964 | Moss | 252/470 |
| 3,632,577 | 1/1972 | Hoyle et al. | 260/240 A |
| 3,645,925 | 2/1972 | Speranza et al. | 260/2.5 AC |
| 3,654,370 | 4/1972 | Yeakey | 260/584 B |
| 3,817,997 | 6/1974 | Carlson | 260/246 B |
| 4,273,885 | 6/1981 | Dominguez et al. | 521/115 |
| 4,433,680 | 2/1984 | Yoon | 128/90 |
| 4,574,793 | 3/1986 | Lee et al. | 128/90 |
| 5,081,162 | 1/1992 | Farkas et al. | 521/133 |

*Primary Examiner*—Helen L. Pezzuto
*Attorney, Agent, or Firm*—Hitt, Chwang & Gaines

[57] ABSTRACT

Dimorpholinodiethylether is treated with hydrogen over a reducing catalyst to improve its isocyanate stability.

4 Claims, No Drawings

DIMORPHOLINODIETHYLETHER HAVING IMPROVED ISOCYANATE STABILITY

This application is a division of application Ser. No. 08/414,937, filed on Mar. 31, 1995.

BACKGROUND OF THE INVENTION

1. Field of the Invention

This invention relates to a dimorpholinodiethylether having improved isocyanate stability and method for making same. The thus treated dimorpholinodiethylether ("DMDEE") is useful in one component moisture cured systems, for example, polyurethane casting materials and high speed cure sealants. The treated DMDEE of the present invention is also useful polyurethane-based sealant compositions, polyurethane casting materials, in the formation of polyurethane foams and reaction injection molded elastomers.

2. Background Information

Dimorpholinodiethylether ("DMDEE") is widely used in one component moisture cured systems. These systems are isocyanate prepolymers that contain a catalyst, e.g., DMDEE. DMDEE catalyzes the water-isocyanate reaction of the prepolymers upon exposure to water, e.g., moisture in the air or added water. However, to provide adequate shelf life, the catalyst must provide good isocyanate stability to avoid side reactions which gel and harden the prepolymer prematurely. These side reactions are generally branching reactions resulting in biuret and allophanate formation and some formation of isocyanate trimer. Isocyanate stability can be tested by adding a catalyst to toluene diisocyanate and observing the formation of solids. DMDEE, prior to the present invention, was not as stable toward isocyanate as desired.

Accordingly, there is a need to improve the isocyanate stability of DMDEE.

SUMMARY OF THE INVENTION

This invention provides a composition, i.e. treated DMDEE, which provides improved isocyanate stability. There is also provided a method for improving the isocyanate stability of DMDEE. The treated DMDEE is prepared by exposing dimorpholinodiethylether (DMDEE) under reducing conditions to a reducing catalyst and hydrogen.

Surprisingly, the treated DMDEE of the present invention provides improved isocyanate stability. However, it is not understood how this treatment affects or changes the untreated DMDEE in regard to the composition thereof. There is no readily apparent difference in composition between the treated and untreated materials. However, a color change is observed.

A composition is also provided comprising an isocyanate-terminated polyurethane prepolymer and a treated catalyst, wherein said catalyst is prepared by exposing dimorpholinodiethylether under reducing conditions to a reducing catalyst and hydrogen.

The composition may be a moisture curable sealant having good stability in the absence of moisture and a rapid cure rate in the sole presence of atmospheric moisture. The sealant comprises an isocyanate-terminated polyurethane prepolymer having an isocyanate functionality from about 2.5 to about 2.7, and admixed therewith from about 0.2 to about 1.75 percent by weight of a treated catalyst based on the weight of said sealant, wherein said treated catalyst is prepared by exposing dimorpholinodiethylether under reducing conditions to a reducing catalyst and hydrogen.

Additionally, a storage-stable orthopaedic cast bandage is provided. The bandage comprises an open-weave fibrous substrate and an isocyanate-terminated polyurethane prepolymer coated on the open-weave fibrous substrate. The prepolymer comprises a polyisocyanate and a polyol in an equivalent ratio of from about 2:1 to about 15:1 and containing from about 0.1 to about 10 percent by weight, based on the weight of said prepolymer, of a treated catalyst, wherein said catalyst is prepared by exposing dimorpholinodiethylether under reducing conditions to a reducing catalyst and hydrogen.

DESCRIPTION OF THE INVENTION

Treated DMDEE

Dimorpholinodiethylether (DMDEE) is a catalyst which catalyzes the water-isocyanate reaction. DMDEE is useful in the formation of polyurethane foams (see U.S. Pat. No. 3,645,925) and reaction injection molding elastomers (U.S. Pat. No. 4,273,885). DMDEE is also useful in high speed cure sealants (see U.S. Pat. No. 4,758,648) and in polyurethane casting materials (see U.S. Pat. No. 4,433,680). The foregoing four patents are incorporated herein by reference. The treated DMDEE of the present invention may be substituted for the DMDEE used in the foregoing patents.

In the present invention, conventional or commercially available DMDEE is treated by exposing it to hydrogen in the presence of a reducing catalyst. The DMDEE treatment process may be conducted as a continuous or batch process. The continuous process is preferably conducted in a fixed bed reactor. A fluidized bed reactor may also be used. In a batch process, the catalyst concentration ranges from about 1 to about 20, preferably about 2 to about 5, percent by weight based on the weight of the DMDEE to be treated.

The DMDEE treatment process may be conducted at a temperature ranging from about 120° C. to about 250° C. with a preferred range being from about 160° C. to about 200° C. The pressure of the hydrogen atmosphere may be varied from about 50 psig to about 5,000 psig, with the preferred range being from about 1,000 psig to about 3,000 psig. The hydrogen can be mixed with an inert gas, for example, nitrogen. If the hydrogen is mixed with an inert gas, the foregoing hydrogen pressures represent the hydrogen partial pressure.

Any conventional reducing catalyst may be used, for example, Ni-based catalysts, and Co-based catalysts. Examples of such catalysts are Raney nickel, Raney cobalt, Engelhard's Ni-1404, Ni-0104 and Co-0164 (Engelhard Corp., Iseline, N.J.), Mallinckrodt's E-211TR, E-221TY and E-230TR (Mallinckrodt Specialty Chemicals Co., Erie, Pa.), and United Catalysts' G-96, G-49B and G-69B (United Catalysts Inc., Louisville, Ky.). Commercially available DMDEE include JEFFCAT™ DMDEE available from Huntsman Corporation.

Another suitable reducing catalyst for use in the process of the present invention is one containing nickel, copper and chromium. Such a catalyst is described, for example, in U.S. Pat. No. 3,152,998 and U.S. Pat. No. 3,654,370, which patents are hereby incorporated by reference, and is prepared by the reduction of a mixture of the oxides of nickel, copper and chromium in the presence of hydrogen at a temperature within the range of about 250° C. to about 400° C. Calculated on an oxide-free basis, the catalyst contains from about 60 to about 85 mole % nickel, from about 14 to about 37 mole % copper, and from about 1 to about 5 mole % chromium. A particularly preferred catalyst composition is one containing from about 70 to about 80 mole % nickel, from about 20 to about 25 mole % copper, and from about 1 to about 5 mole % chromium.

Isocyanates

The isocyanates useful in the prepolymer system of the present invention may be any of the polyisocyanates known in polyurethane chemistry which are described, for example, in U.S. Pat. Nos. 3,632,577, 4,433,680 and 4,758,648, which are all hereby incorporated herein by reference.

The polyisocyanates are reacted in excess with polyols for formation of the isocyanate-terminated polyurethane prepolymers of the present invention. Suitable polyisocyanates include aliphatic, cycloaliphatic, araliphatic, or aromatic polyisocyanates, suitably di- and/or tri-isocyanates. The aromatic polyisocyanates typically yield prepolymers with faster reaction rates when the prepolymers are used with the treated DMDEE.

Particularly preferred materials for use in "one package" sealant systems according to the present invention are diphenyl-methane-4,4'-diisocyanate having aromatic characteristics, the cycloaliphatic diisocyanate $^3$-isocyanatomethyl-3,5,5-trimethylcyclohexyl isocyanate (isophorone diisocyanate), and dicyclohexyl-4,4'-methane diisocyanate. Mixtures of two or more of these preferred materials are also preferred for use in the present invention. A "one package" sealant systems is a system having an isocyanate-terminated polyurethane prepolymer capable of rapid cure without addition of water thereto, which system is highly reactive in the presence of atmospheric moisture alone. See U.S. Pat. No. 4,758,648.

In polyurethane casting materials of the present invention, the aromatic polyisocyanates preferred include tolylene diisocyanate (TDI), such as the 80/20 or the 65/35 isomer mixture of the 2,4 and 2,6 isomeric forms; diphenylmethane diisocyanate (MDI), such as the 4,4', the 2,4' and the 2,2' isomeric forms or isomeric mixtures thereof; modified MDI containing additional functional groups such as carbodiimide groups, urethane groups and allophanate groups; and polymethylene polyphenylisocyanates (Polymeric MDI) which are derived from phosgenation of the condensation products of aniline and formaldehyde. Most preferred polyisocyanate is the carbodiimide containing MDI which is readily available commercially, e.g., Isonate®43L and Rubinate®XI-168. See U.S. Pat. No. 4,433,680.

Polyols

The polyols that may be used to prepare the isocyanate-terminated prepolymer are the same as those commonly employed in the prior art for preparing polyurethane resins, e.g., polyester polyols and, particularly, polyether polyols. The polyester polyols include lactone polyols prepared by the polymerization of lactones, e.g., e-caprolactone; compounds such as castor oil; and polyester polyols formed by the reaction of polyhydric alcohols and polybasic carboxylic acids, e.g., an alkylene glycol with a dicarboxylic acid. Instead of free carboxylic acids, the corresponding polycarboxylic acid anhydrides or the corresponding polycarboxylic acid esters of low alcohols or mixtures thereof may be used for preparing the polyesters.

Polyether polyols may be prepared by forming alkylene oxide adducts of the polyester polyols and lactone polyols discussed above, or by the reaction of alkylene oxides with materials such as castor oil. However, the preferred polyether polyols are polyoxyalkylene polyols, e.g., polyoxyalkylene diols prepared, for example, by the homopolymerization or copolymerization of epoxides, such as ethylene oxide, propylene oxide, butylene oxide, tetrahydrofuran, styrene oxide, or mixtures thereof in the presence of the catalysts. Polyoxyalkylene triols, for example, linear compounds having pendant hydroxy groups or having branched polyether chains, may also be employed as starting compounds in admixture with diols.

Prepolymers

The isocyanate-terminated polyurethane prepolymers of the invention are prepared by the reaction of polyisocyanate with a polyhydroxy compound (polyol). In this reaction, the polyisocyanate is employed in excess so that the resultant prepolymers have isocyanate terminals. If part or all of the polyhydroxy compound has an hydroxy functionality of more than two hydroxy groups per molecule, the polyurethane reaction product is not linear but branched. When later crosslinked, such a branched polymer develops a thermoset polyurethane (elastomeric) character.

The ratio of the polyisocyanate to the polyol in the prepolymer reaction mixture is best expressed by the equivalent ratio. Equivalent weight (or equivalency) is determined by dividing the molecular weight of each particular component by its functionality or number of functional groups in the compound. The equivalent ratio is the ratio of the equivalency of the isocyanate to the polyol. The equivalent ratio in the present system should be between 2:1 to approximately 15:1 equivalents of the polyisocyanate to the polyol and preferably from 2:1 to 10:1. These components are combined so that there is an excess of from 5% to 30% NCO groups in the prepolymer.

As known in the art, the polyols and polyisocyanates are suitably reacted at a temperature between 0° C. and 120° C., preferably between 25° C. and 90° C. The reactions are carried out under an inert atmosphere such as a nitrogen blanket and under anhydrous conditions. The reaction may be suitably be carried out in the presence of a catalyst. The stannous salts of carboxylic acid, such as stannous octoate, stannous oleate, stannous acetate, and stannous laurate are known as catalysts for the formation of urethanes. Also, dialkyltin dicarboxylates such as dibutyltin dilaurate and dibutyltin diacetate are known in the art as urethane catalysts, as are tin mercaptides. The amount of catalyst employed is generally between 0.005 and 5 percent by weight of the reaction mixtures catalyzed, depending on the nature of the isocyanate.

The polyols employed in preparing the isocyanate-prepolymer for "one package" sealant compositions, having two or more hydroxyl groups, generally have a molecular weight between about 500 and 6,000 and have hydroxy equivalent weights between 50 and 2,000. The preferred polyoxyalkylene polyols, such as polyoxypropylene, have hydroxy equivalent weights between 200 and 2,000. The materials are reacted with excess isocyanate until the isocyanate content in the prepolymer is close to the desired value, as determined by titrating the free isocyanate groups in a sample of the prepolymer with dibutylamine. The resulting prepolymers having terminal isocyanate groups have molecular weights between about 3,000 and about 10,000. The preferred prepolymers have a molecular weight between about 3,000 and 6,000.

In prepolyurethane casting materials, the preferred prepolymer is made from diphenylmethanediisocyanate containing carbodiimide groups. These diisocyanates are reacted with a polyol containing two to three functional groups. The polyols may be diols or triols or mixtures of diols and triols. The preferred polyols are poly (oxypropylene)glycol having a hydroxyl number of 105 and poly(oxypropylene) triol having a hydroxyl number of 232. The molecular weight of the polyols is usually at most 2,000, preferably in the range of 400 to 2,000, more preferably in the range of 700 to 1,500, and most preferably between 700 and 1,100. Examples of suitable commercially available polyols are Pluracol®P1010 and Poly G®36-232 (available from Olin Corporation, Brandenburg, Ky. 40108).

Sealant Compositions

A sealant is provided comprising an isocyanate-terminated polyurethane prepolymer in combination with treated DMDEE as a catalyst therefor, in which the sealant compositions have very rapid cure rates in the presence of atmospheric moisture alone, without the addition of water. Such compositions permit the elimination of the mixing of water with the sealant just prior to use with all the disadvantage that this entails in the way of equipment, manpower, considerations of pot life, etc.

More in particular, the sealants according to the present invention comprise prepolymers having an isocyanate functionality between 2.3 and 3.0, and preferably between 2.5 and 2.7. With such prepolymers, treated DMDEE of the present invention is employed as a catalyst at a concentration between 0.2 and 1.75 percent by weight of the finished sealant compound, preferably between 0.4 and 1.3 percent. At these concentrations, sealants having both an excellent cure rate and good storage stability are obtained.

For formulating sealant compositions, the prepolymer/catalyst mixtures of the invention are combined with fillers and additives known in the prior art for use in elastomeric compositions. By the addition of such materials, physical properties such as viscosity, flow rate, sag, and the like can be modified to desired values. However, to prevent premature hydrolysis of the moisture sensitive groups of the prepolymer, the fillers should be thoroughly dried before admixture therewith. Exemplary filler materials and additives include materials such as carbon black, titanium dioxide, clays, calcium carbonate, surface treated silicas, ultraviolet stabilizers, antioxidants, and the like. This list, however, is not comprehensive and is given merely as illustrative.

Such sealants may also contain one or more plasticizers to modify Theological properties to a desired consistency. Such materials should be free of water, inert to isocyanate groups, and compatible with the polymer. Suitable plasticizers are well known in the art and include alkyl phthalates such as diocytl phthalate or dibutyl phthalate, partially hydrogenated terpene commercially available as "HB-40," and alkyl naphthalenes. Diethyl malonate can be used as a stabilizer. Still other materials well known in the art may be used for the compounding of materials of this type.

Polyurethane Orthopaedic Casting Bandage

Casting bandages according to U.S. Pat. No. 4,433,680 but utilizing the treated DMDEE of the present invention have improved isocyanate stability. This improves shelf-life relative to untreated DMDEE at the same concentrations or have equivalent shelf-lives with increased concentration of treated DMDEE relative to untreated DMDEE. The composition comprises the prepolymer and from 0.1% to 10% by weight based on the weight of the total mixture of the treated DMDEE as a catalyst. The preferred amount of catalyst is from 1% to 5% based on the weight of total mixture.

It is also possible to use a small amount of a co-catalyst with the treated DMDEE catalyst. Such co-catalyst may be a commonly used urethane catalyst such as a metal catalyst.

In addition to the polyisocyanate, the polyol and the catalyst, the prepolymer reactants may also include a small amount, 0.01% to 1% by weight, of a stabilizer such as benzoyl chloride and a surfactant agent such as a silicone liquid used as an antifoam agent. The surfactant or antifoam agent would be present in an amount of from 0.01% to 1% by weight.

The prepolymer is reacted under the following conditions: a reaction vessel is placed under a vacuum, and the isocyanate component is added to the vessel. The vacuum is released, nitrogen is added to the vessel, and the antifoam agent is added to the isocyanate component. Benzoyl chloride is added to the vessel and mixed thoroughly with the reactants. Vacuum dried polyols containing the catalyst are then added to the reaction vessel over a period of from 20 to 25 minutes. The reaction temperature is maintained between 50° C. and 60° C. for one hour. The completion of the reaction can be determined by obtaining a sample of the reaction product and testing for the desired level of NCO in the prepolymer.

The prepolymer is then applied in a dry atmosphere to a substrate by reverse roll coating or other coating technique to form the cast bandage. The substrate may be a knitted or woven fabric having a weight of from about 50 to about 350 grams per square meter and preferably from about 70 to about 290 grams per square meter. The fibers in the fabric may be synthetic fibers such as polyester, natural fibers such as cotton or may be fiberglass. Suitable fabrics for the substrate include those disclosed in U.S. Pat. Nos. 3,882,857, 3,787,272 and 4,134,397. The weight of prepolymer on the fabric is from about 80 to about 200 grams per square meter, preferably from about 100 to about 150 grams per square meter. Immediately after the prepolymer is applied to the fabric, the coated fabric is packaged in an inert atmosphere to prevent any contact with atmospheric moisture.

When the bandage is to be used, it is removed from the package and placed in water for from about 3 seconds to about 30 seconds, but preferably from about 5 to about 10 seconds. It is removed from the water and applied to the patient, usually over a tubular, knitted fabric and a cast padding. The bandage will sent within less than 10 minutes to a condition where it is capable of immobilizing the fracture.

EXAMPLE 1

The reaction was carried out in a continuous reactor which was a stainless steel tube of 1.34 inch inside diameter and 55 inches in length. The reactor contained about 1,250 ml. of pre-reduced, pelleted nickel-copper-chromium catalyst according to U.S. Pat. No. 3,152,998 containing about 75 mole % nickel, about 23 mole % copper and about 2 mole % chromium. Into the reactor were metered about 4 pounds per hour untreated DMDEE (i.e., starting DMDEE) having the composition in Table 1 and about 145 liters per hour (measured at 0° C. and 1 atmosphere) of hydrogen. The reactor operated at about 2,000 psig pressure. Three different temperatures were used which were Sample A at about 160° C., Sample B at about 180° C. and Sample C at about 200° C. The crude reactor products were analyzed and tested in toluene diisocyanate.

The gas chromatogram results for the starting DMDEE and Samples A, B and C are given in Table 1.

TABLE 1

| | SAMPLE (Area %) | | | |
|---|---|---|---|---|
| Component | A | B | C | Starting DMDEE |
| Morpholine | 0.14 | 0.21 | 0.27 | 0.21 |
| N-ethylmorpholine | 0.05 | 0.08 | 0.29 | 0.03 |
| Methoxyethylmorpholine/ | 0.40 | 0.40 | 0.33 | 0.38 |
| Hydroxyethoxyethylmorpholine Aminoethoxyethylmorpholine | 1.02 | 1.08 | 0.99 | 1.09 |
| Dimorpholinoethane | 7.92 | 8.05 | 8.09 | 8.00 |
| Bis(dimorpholinoethyl)ether (DMDEE) | 87.92 | 89.25 | 88.68 | 89.09 |
| TOTAL[a] | 97.45 | 99.07 | 98.65 | 98.80 |

[a]The rest of the composition consisted of minor components that have not been idenitfied.

Though the gas chromatograms of the starting DMDEE and Samples A, B and C do not differ greatly, treatment of the starting DMDEE according to the process of the present invention did produce a color change. The starting DMDEE had a yellow color (Gardner 6 or higher) and Samples A, B and C (i.e., treated DMDEE) had a water white color. Accordingly, a change is produced in the starting DMDEE by treatment according to the present invention, although such change is not apparent from the gas chromatograms thereof.

Samples A, B, C and untreated DMDEE were tested for isocyanate stability. About 1 gm. of the respective samples was combined with about 25 gms. of toluene diisocyanate in a bottle and then allowed to stand at room temperature. They were examined periodically to observe any change. Further, Sample C was further treated by stripping at 95° C. and at 0.25 mm. Hg vacuum for about 1 hour. After allowing the samples to stand for 5 days in the toluene diisocyanate, crystals were present in the starting DMDEE sample whereas Samples A, B and C remained as a clear liquid.

The foregoing results demonstrate that treating DMDEE with hydrogen in the presence of a reducing catalyst improved the isocyanate stability thereof. In view of the improved isocyanate stability, the treated DMDEE of the present invention is particularly useful in one-component urethane systems which utilize pre-polymers having isocyanate groups and improve the shelf life thereof.

What is claimed is:

1. A method for improving isocyanate stability of dimorpholinodiethylether, comprising:

exposing a mixture containing dimorpholinodiethylether to a nickel-based catalyst and hydrogen at a temperature ranging from about 120° C. to about 250° C. and a pressure ranging from about 50 psig to about 2,000 psig, said dimorpholinodiethylether comprising at least about a majority weight percent of said mixture.

2. The method of claim 1, wherein the catalyst is a nickel-based catalyst.

3. The method of claim 1, wherein the nickel-based catalyst comprises from about 60 to about 85 mole % nickel, from about 14 to about 37 mole % copper and from about 1 to about 5 mole % chromium.

4. The method of claim 3, wherein the nickel-based catalyst comprises from about 70 to about 80 mole % nickel, from about 20 to about 25 mole % copper and from about 1 to about 5 mole % chromium.

* * * * *